Patented Dec. 4, 1923.

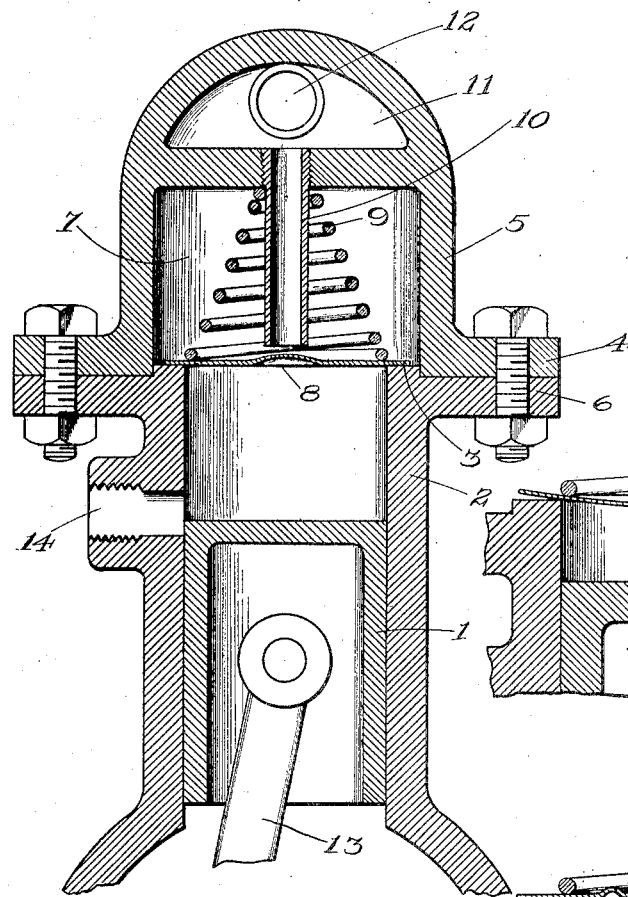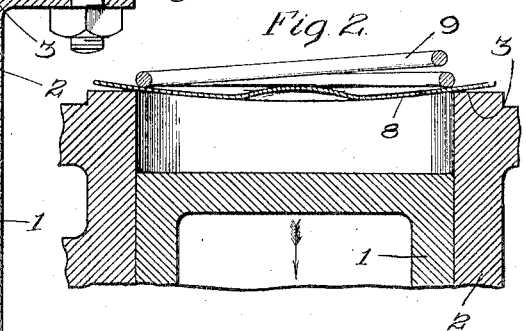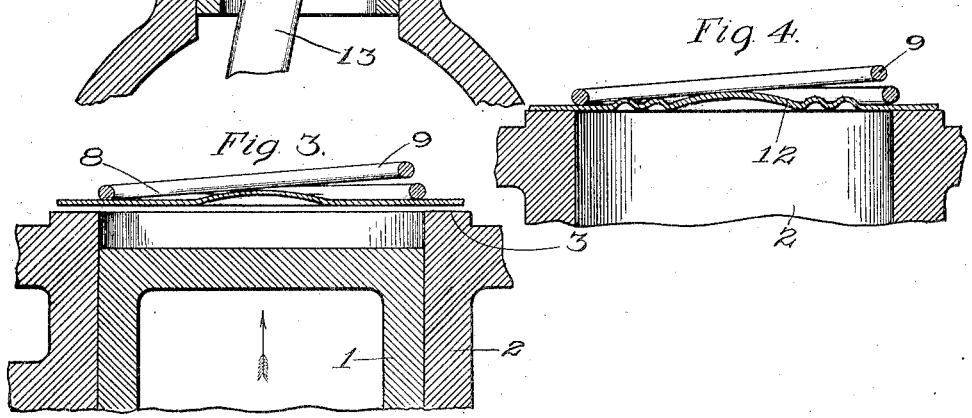

1,476,383

UNITED STATES PATENT OFFICE.

JOHN TWARDOWSKY, OF CHICAGO, ILLINOIS, ASSIGNOR, BY MESNE ASSIGNMENTS, TO UNIVERSE CORPORATION, OF CHICAGO, ILLINOIS, A CORPORATION OF ILLINOIS.

CHECK VALVE.

Application filed August 22, 1921. Serial No. 494,326.

*To all whom it may concern:*

Be it known that I, JOHN TWARDOWSKY, citizen of Russia, residing at Chicago, in the county of Cook and State of Illinois, have invented certain new and useful Improvements in a Check Valve; and I do hereby declare the following to be a full, clear, and exact description of the invention, such as will enable others skilled in the art to which it appertains to make and use the same.

My invention relates to check valves and in one of its general aspects aims to provide an exceedingly simple and inexpensive check valve construction which will be noiseless and self-cleaning in operation. For this purpose my invention aims to provide a valve arrangement employing a cheaply manufactured disk of metal or the like as the movable valve member and aims to arrange the parts so that the valve will operate with an exceedingly small movement of this valve member, and so that this minuteness of movement will cooperate with the lightness of the movable member in avoiding the hammering noise which has been so objectionable in older types of valves. Furthermore, my invention aims to accomplish this purpose in a construction not requiring an exact interfitting of the parts and not requiring delicate springs or other delicate elements of any kind.

In a further aspect, my invention relates to check valves for use with air compressors or the like and aims to provide a valve arrangement which will readily prevent lubricating oil from accumulating and thereby clogging the proper action of the valve. More particularly, my invention aims to provide a valve adapted to seat upon the end of a compressor cylinder and aims to provide an unusually simple and effective arrangement for utilizing a light valve member as the closure for the end of the cylinder and for preventing the accumulation of lubricating oil beyond the said closure. Still further and more detailed objects will appear from the following specification and from the accompanying drawings, in which Fig. 1 is a central and longitudinal section through the compression cylinder and compressed-fluid receiving chamber of a fluid compressor equipped with my invention, showing the movable member in the position in which it forms a closure or head for the compression cylinder and shuts off the connection between this cylinder and the fluid-receiving chamber, and with the piston at the end of its intake stroke.

Fig. 2 is a similar but enlarged section showing the disposition of the valve member during the intake stroke of the compressor, while Fig. 3 is a correspondingly enlarged section showing the disposition of the valve when the piston is substantially at the end of its compression stroke and is discharging the compressed fluid into the fluid-receiving chamber.

Fig. 4 is a fragmentary section similar to a portion of Fig. 1 and showing a partly corrugated valve member as part of an alternative embodiment of my invention.

In constructing compressors for use as parts of mechanical refrigerating systems and for other purposes, the number of needed parts can be considerably reduced by providing a movable head as the closure for the discharge end of the compression cylinder and by using this head as the movable member of the check valve which controls the discharge of compressed fluid from the cylinder. Such a construction is shown for example in the copending applications #469110 and 473781 of Hanson & Twardowsky relating to compressors, but has the objection that the weight of the movable cylinder head causes this to produce a considerable hammering action, so that the resulting mechanism is noisy when operated at any considerable speed, even if the extent of movement of this combination valve member and cylinder head is quite small. Furthermore, the pressure differences between the interior of the cylinder and the chamber into which the compressed fluid is discharged causes lubricating oil to be carried with the compressed fluid into this chamber and if the oil is allowed to accumulate in the latter, it may interfere with the proper action of the refrigerating mechanism or other system of which the compressor forms a part. So also, any particles of dust or the like admitted through the intake of the compressor are apt to catch under the movable cylinder head, thereby interfering with the proper closing of the latter and hence reducing the extent of the effective compression.

To overcome all of these objections, I employ a cylinder head made of sheet material with a contour somewhat smaller than the adjacent bore of the fluid-receiving chamber and having an edge portion adapted to seat flatwise on the discharge end of the cylinder. I also provide spring means continuously tending to seat this cylinder head or valve member, and make the latter out of a resilient material adapted to be flexed by pressure differences between its opposite faces so as to alter its diametrical cross section, and I desirably form the central portion of this movable valve member so as to retard the alteration in cross section in the middle portion of the member.

For example, Fig. 1 shows a fluid compressor having a piston 1 slidable in a cylinder 2 which has its rear end cut off square to afford an annular shoulder 3. Surrounding this annular shoulder is the annular flange 4 of a fluid-receiving chamber 5, the flange 4 being bolted to a corresponding flange 6 on the rear end of the cylinder. Within the fluid-receiving chamber 7 is a combined valve member and cylinder head 8, desirably consisting of a thin disk of phosphor bronze, which disk normally has its edge portions in a single plane so that these edge portions seat flatwise on the annular seat 3. Within the chamber 7 I also dispose a spring 9 continuously bearing against the rear face of the valve member 8 and desirably engaging the said face along a circle of the same diameter as the bore of the cylinder 2, or in other words opposite the inner edge of the adjacent end of the cylinder. For this purpose, I am here showing a spring 9 as tapered to increase its diameter downward and as having its upper end loosely fitting around a vertical pipe 10 which forms a discharge outlet for the chamber 7 and which leads through an auxiliary chamber 11 to an outlet pipe 12.

In operation, the up-stroke or compression stroke of the piston will cause the fluid (which has previously been admitted to the intake 14) to be compressed within the cylinder and the resulting pressure will tend to raise the movable head 8 against the pressure of the spring 9. By properly selecting this spring to secure the requisite resistance, I can readily arrange a construction so that the resistance of the spring will not be overcome until the piston is close to the end of its compression stroke. Then the overbalancing of the spring and of the residual pressure in the chamber 7 by the pressure of the compressed fluid will lift the head 8 bodily, thereby permitting the highly compressed fluid to pass around the edge of the disk 8 into the chamber 7 until the difference in pressure between the interior of the cylinder and the chamber 7 is too small to overbalance the resistance of the spring 9. Then this spring will again seat the disk 8 and the ensuing downward or intake stroke of the piston will reduce the pressure within the cylinder to a point considerably lower than the pressure in the chamber 7. Consequently, the pressure difference will tend to bow the thin disk 8 into the cylinder and the resulting downward convexing of the disk will rock the extreme edges of the latter upwardly as shown in Fig. 2. That is to say, the extreme inner edges of the seat 3 will resist the convexing and will be continuously in firm engagement with the disk during the downward or intake stroke of the piston. Meanwhile, the discharge of fluid from the chamber through the tube 10 and the outlet duct 12 reduces the pressure in the chamber and when the piston opens the inlet 14 and admits a fresh charge of fluid to the cylinder the partial vacuum in the cylinder is overcome and the resiliency of the valve disk restores it to its normal shape as shown in Fig. 1, so that the disk bears with its edge portion flatwise on the seat 3. In practice, the rocking of the valve disk on the inner edge of the seat 3 affords a slight scraping action, thereby keeping the parts clean and rubbing off any particles of dust or the like, so that these will not tend to settle between the disk and its seat. To avoid undue convexing of the disk during its flexing, I desirably restrict this flexing substantially to the outer edge portion of the disk, this being readily accomplished by giving the middle portion of the disk a permanent upward curvature after the manner shown in Figs. 1 and 2.

Owing to the large diameter of the cylinder as compared with that of the inlet for the same, a slight lifting of the cylinder head will afford an ample opening for the speedy discharging of the compressed fluid. Consequently, my construction will operate with an exceedingly slight lifting of the cylinder head or valve member, so that with a rapidly oscillating piston, the cylinder head almost seems to float at the top of the cylinder. Owing to the small extent of this movement and to the lightness of the flexible metal disk suitable for the purpose, the hammering noise met with older constructions employing movable cylinder heads is effectively avoided, and in practice the thin film of oil which forms on the seat 3 deadens these minute blows so that my construction is entirely noiseless.

The oil just mentioned is gradually carried out of the cylinder with the compressed fluid, being some of the lubricating oil which is required for maintaining the durability of the piston and cylinder. This oil tends to accumulate in the chamber 7 and if freely allowed to do so, might seriously clog other portions of the refrigerating mechanism. To avoid this, I do not connect the chamber 7 directly to the discharge outlet 12 or even to the auxiliary chamber 11 from which this outlet leads, but interpose a pipe 10 extending from the auxiliary chamber 11 into the chamber 7 almost down to the top of the disk 8. Then when the oil accumulates within the bottom of the chamber 7 to a sufficient height to close the entrance to the pipe 10, a further forcing of oil into the chamber 7 will tend to compress the fluid in the chamber above this oil and the resulting pressure will force the oil up the tube 10. Consequently, the chamber 7 automatically discharges itself of accumulated oil and as the slight lift needed for the disk 8 permits the pipe 10 to approach quite close to this disk, the amount of oil thus discharged at each spurt can be quite small.

However, while I have illustrated and described an embodiment of my invention including certain desirable features of construction and arrangement, such as the employment of the pipe 10 for a two-fold purpose and the shaping of the valve disk with a single central dome, I do not wish to be limited to these or other details of the disclosed arrangement, it being obvious that the same might be modified in many ways without departing from the spirit of my invention or from the appended claims. For example, instead of employing a single upwardly directed central dome shape for effectively limiting the flexing of the valve disk to its radially outward portion, I may provide this disk with a series of annular corrugations after the manner shown in Fig. 4. So also, I do not wish to be limited to any particular material for the valve disk, nor to a particular shape of spring, although I preferably make the downward end of the spring bear against the valve disk in substantial alinement with the bore of the cylinder. Thus disposed, the pressure of the spring has no effect on the convexing or inconvexing of the disk and only needs to be of the small tension required for positively and rapidly seating the valve disk when the pressures on opposite faces of the disk are substantially equal. Without the spring, the seating of the valve might be too slow to respond to a rapid downward movement of the piston, thereby permitting some of the compressed fluid to be sucked back into the cylinder, which is effectively prevented by the use of the spring.

Nor do I wish to be limited to the use of my check valve in connection with a fluid compressor or as its double function of a valve member and a cylinder head.

I claim as my invention:

1. A check valve comprising a flat annular seat, a flexible disk having its edge portion overhanging the seat, and spring-pressed means pressing against the disk on the face opposite the seat along a circle coaxial with and smaller in diameter than the bore of the seat whereby to fulcrum the disk upon the inner edge of the seat to cause a convexing of the disk when seated, the disk being formed for retarding the convexing of the portion thereof radially inward of the said fulcrum circle.

2. A check valve comprising a flat annular seat, a flexible disk having its edge portion overhanging the seat, and spring-pressed means pressing against the disk on the face opposite the seat and arranged for fulcruming the disk upon the inner edge of the seat to cause a convexing flexure of the disk when seated, the disk having its central portion arched to retard the flexing thereof.

3. A check valve for a compressor or the like, comprising a casing having an annular flat seat therein, a flexible disk having its edge portion overhanging the said seat, spring means urging the disk against the seat, and an outlet duct having its inlet within the casing on the opposite side of the disk from the seat and close to the disk to limit the trapping of oil within the casing on the said opposite side of the disk.

4. A check valve for a compressor or the like, comprising a casing having an annular flat seat therein, a flexible disk having its edge portion overhanging the said seat, spring means urging the disk against the seat, and an outlet duct having its inlet within the casing on the opposite side of the disk from the seat and close to the disk to limit the trapping of oil within the casing on the said opposite side of the disk, the outlet duct serving also to limit the bodily movement of the disk away from the seat.

5. A check valve for a compressor or the like, comprising a casing having a flat seat in one wall thereof and having a perforation in a wall opposed thereto, a flexible disk disposed within the casing and having its edge portion normally in engagement with the seat, an outlet duct connected to the perforation in the second named wall and extending close to the disk to limit the trapping of oil within the casing, and a spiral compression spring bearing at one end against the disk and centered at its other end by engagement with the outlet duct.

6. A check valve for a compressor or the like, comprising a casing having a flat seat in one wall thereof and having a perforation in a wall opposed thereto, a flexible disk disposed within the casing and having its edge portion normally in engagement with the seat, an outlet duct connected to the perforation in the second named wall and extending close to the disk to limit the trapping of oil within the casing, and a spiral compression spring interposed between the disk and the second named wall, the outlet duct being coaxial with the seat and being engaged by the spring adjacent to the second named wall to center the spring.

7. In an air compressor or the like, a cylinder open at its discharge end, a cap of larger bore than the cylinder secured directly to the said end of the cylinder in alinement therewith so that the said end of the cylinder affords an annular seat directed towards the bore of the cap, the cap having an integral partition within it parallel to the said seat, a flat disk having its edge portion normally bearing against the seat, and a compression spring disposed within the cap and operatively interposed between the disk and the said partition.

Signed at Chicago, Illinois, August 16th, 1921.

JOHN TWARDOWSKY.